United States Patent [19]

Ostler

[11] Patent Number: 4,461,241
[45] Date of Patent: Jul. 24, 1984

[54] AUTOMATIC ANIMAL MONITORING APPARATUS

[75] Inventor: Earl W. Ostler, Billings, Mont.

[73] Assignee: Agri-Systems, Billings, Mont.

[21] Appl. No.: 389,221

[22] Filed: Jun. 17, 1982

Related U.S. Application Data

[63] Continuation-in-part of Ser. No. 243,464, Mar. 13, 1981, Pat. No. 4,350,118.

[51] Int. Cl.³ .............................................. A01K 5/02
[52] U.S. Cl. ................................................ 119/51 R
[58] Field of Search ............... 119/14.08, 14.14, 51 R, 119/52 AF, 155

[56] References Cited

U.S. PATENT DOCUMENTS 3,929,277 12/1975 Byrne et al. ...................... 119/51 R
4,279,219 7/1981 Brooks .............................. 119/51 R

FOREIGN PATENT DOCUMENTS 1577028 10/1980 United Kingdom ............. 119/51 R

Primary Examiner—Robert P. Swiatek
Attorney, Agent, or Firm—Arthur L. Urban

[57] ABSTRACT

Animal monitoring apparatus including an animal reviewing portion, an animal identifying portion and a control portion; the animal reviewing portion including a plurality of animal detecting stations, the animal identifying portion including a transmitter section and a receiver section, the transmitter section being disposed on an animal, the transmitter section including a signal generator, a signal coder and an actuator; the receiver section being disposed adjacent to the reviewing portion, the receiver section including a power source, a transmitter actuator, an antenna, a signal receiver, a signal decoder and signal transferring mechanism, each of the receiver sections being connected electrically with receiver sections of all other animal detecting stations and with interrogating mechanism, the interrogating mechanism sequentially searching each of the receiver sections in a continuous rapidly repeating sequence, memory mechanism capable of accepting an animal performance schedule, mechanism for comparing signals from the interrogating mechanism with the animal performance schedule, mechanism for selectively activating electrical actuating mechanism, and recording mechanism for compiling a log of the activation of the electrical actuating mechanism and the time periods of such activations.

10 Claims, 5 Drawing Figures

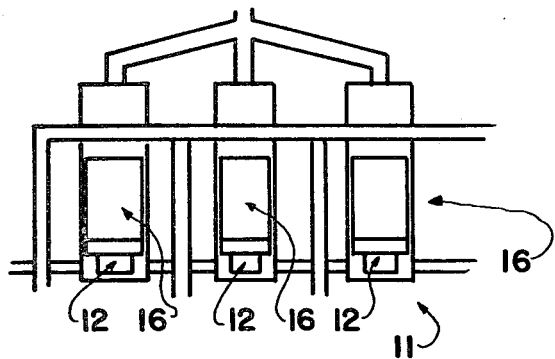
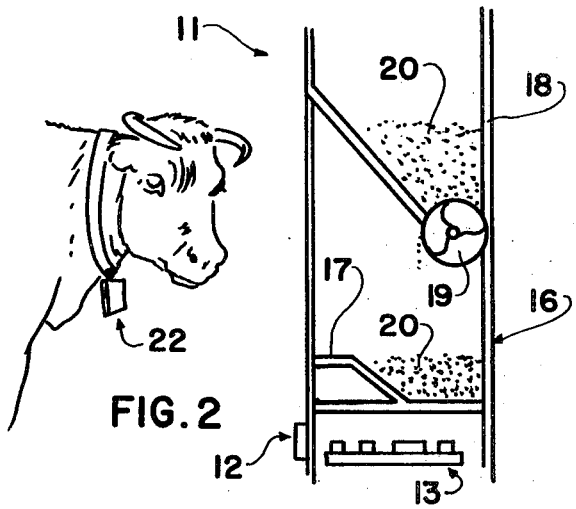
FIG. 1  FIG. 2
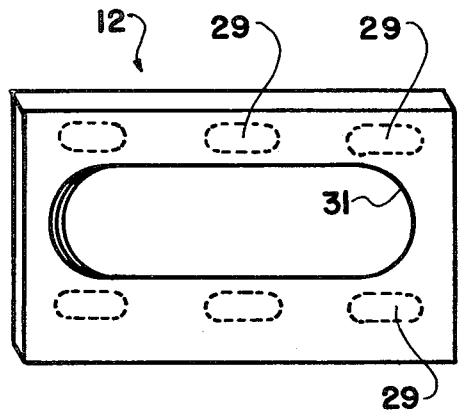
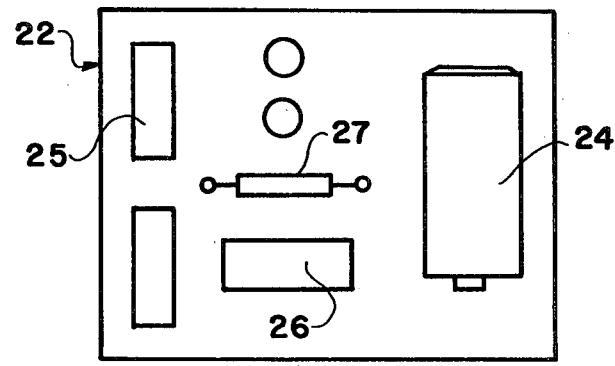
FIG. 3  FIG. 4
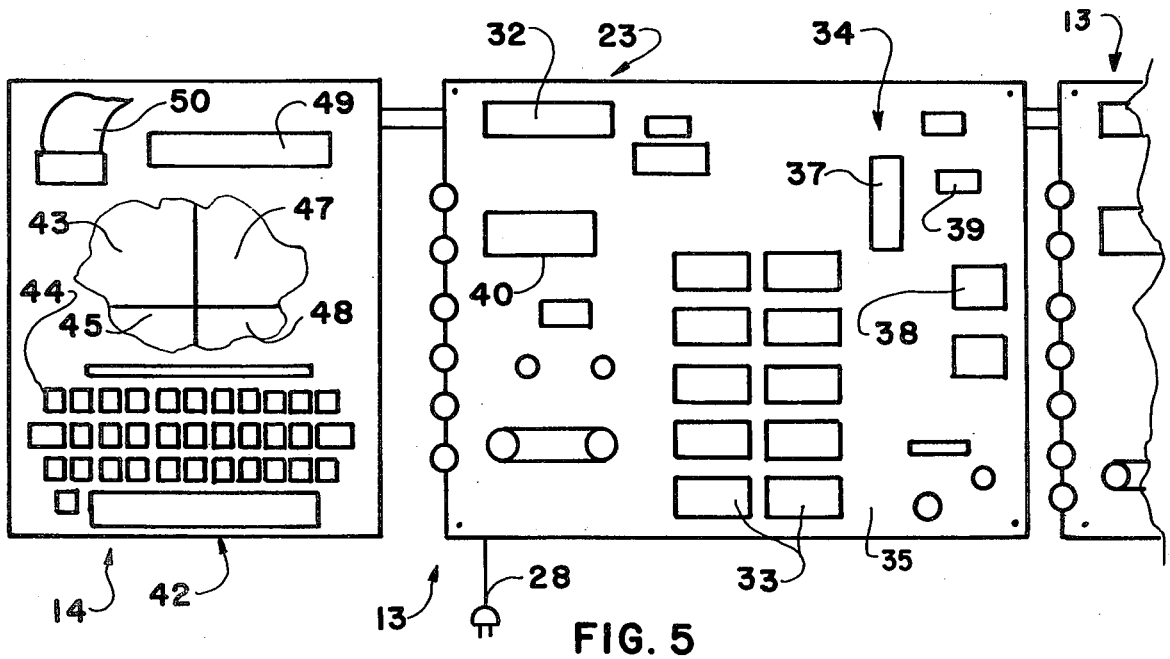
FIG. 5

AUTOMATIC ANIMAL MONITORING APPARATUS

This application is a continuation-in-part of pending application Ser. No. 243,464, filed Mar. 13, 1981, and now U.S. Pat. No. 4,350,118.

This invention relates to a novel monitoring apparatus and more particularly relates to a new apparatus for monitoring animals.

Many years ago it was customary to feed animals simply by placing the food on the ground or in a pan or bucket. While this arrangement is satisfactory for a single animal, problems can arise when more than one animal is being fed. For example, one of the animals may be more aggressive and eat not only his own share but also that of the other animals. If an animal does not receive an adequate feed ration, it will not grow properly. Furthermore, failure to eat is a common way for an animal owner to detect at an early stage whether an animal is sick. However, if a number of animals are being fed together, their owner cannot readily detect if one of the animals is not eating and is sick since the food would always be eaten if not by one animal then by another.

As animal raising has become more scientific, animal owners have attemped to keep a record on the performance of each animal. In this way, a farmer or rancher can determine which animals are least productive and these animals can be sold or slaughtered. It is relatively easy to weigh an animal periodically to determine its weight gain or to keep a record of the milk a cow gives and thus determine the output of the animal. However, it is much more difficult to determine the intake of n animal, that is, the quantity of food eaten by a particular animal where a large number of animals are involved.

One way to keep a record of the feed an animal eats is to feed each animal in an individual closed stall. However, with cattle, horses or other animals that are kept in fenced areas it is difficult to determine the feed consumed by each animal. Generally, ranchers simply observe their animals occasionally as they are eating and if they are eating normally when observed, the ranchers assume that the same eating patterns are taking place at the times the animals are not being observed. At best, this is a haphazard and inaccurate way of determining feeding habits and amounts consumed. Furthermore, it is a very nebulous basis on which to decide which animals to keep and which to eliminate from a herd.

It has been proposed to utilize automatic feeding systems to provide a way to control the feed received by each animal. One system utilizes a computer to control a number of individual feeding stations. Each feeding station has a sensor which can detect or read the code on the tag hanging from the neck of each animal. A signal is sent by the sensor to the computer which is programmed to deliver a given amount of feed in increments to a particular animal each day or fraction thereof. The computer also is programmed to record the quantity of feed delivered to a particular animal standing at the feeding station. Thus, the computer can make available to a rancher a record of how much feed a given animal has eaten on a particular day. Such a record can provide a sound factual basis for deciding which animals are least productive and thus should be eliminated from a herd.

Although the above animal feeding system in theory appears to provide a useful way of keeping records of feed consumed by an animal, in practice the system may not function in a trouble free manner. The successful operation of the system requires that the system properly identify the animal at the feed station. If the system does not properly identify each animal, the errors will result in the animals being fed the wrong quantities of food. Thus, the feeding system may be no better than simple nonregulated feeding.

The failure of the automatic feeding system may be due to the sensor being unable to pick up the identity of a particular animal. If the system does not sense that an animal is waiting to be fed, the animal may wait at the feed station and not only not be fed but also will prevent other animals from being fed. On the other hand, if the system identifies an animal incorrectly, one animal will get another animal's feed ration and the second animal will not receive the food to which it is entitled. Unfortunately, the animal owner will not be aware of the misfeeding and will assume that the second animal did not request its complete feed ration.

Further problems with some automatic feeding systems may be in programming and recording functions. ordinarily, the programming and recording apparatus must be placed close to the feeding stations. This may require that the feeding stations be located closer together than desired. Alternatively, systems may require extra programmers and recorders for individual stations or separate groups of stations. Such a requirement will of necessity add considerably to the cost of a system which includes a large number of feeding stations. Thus, it may be necessary for the animal owner to make the rounds of a number of programmers and recorders located at different locations. In addition, with such systems the collected data may have to be collated to provide a master report of the feeding activities of a herd.

The present invention provides a novel apparatus which automatically monitors animals at a large number of stations at widely spaced locations. The monitoring apparatus provides a programming function for selecting a performance schedule for each individual animal. Also, the apparatus provides a recording function for logging the performance by each animal during a given time period. The programming and recording functions as well as the operating controls of the monitoring apparatus may be located at a point remote from the stations. In addition, the apparatus can collect and corrolate information from a large number of stations at widely spaced locations.

The monitoring apparatus of the invention provides a high degree of accuracy both in detecting the presence of an animal and in identifying a particular animal. The apparatus further provides a high degree of reliability in the furnishing of records to the owner of the animals.

The animal monitoring apparatus of the present invention is simple in design. The apparatus can be fabricated from commercially available materials and componenets using conventional manufacturing techniques. The apparatus of the invention can be installed easily either as a part of new facilities or in areas presently in use.

These and other benefits and advantages of the novel animal monitoring apparatus of the present invention will be apparent from the following description and the accompanying drawings in which:

FIG. 1 is a schematic illustration of one form of animal monitoring apparatus of the invention;

FIG. 2 is an enlarged fragmentary side view in section of the monitoring apparatus shown in FIG. 1;

FIG. 3 is an enlarged fragmentary front view of one form of an animal reviewing portion of the monitoring apparatus shown in FIG. 1;

FIG. 4 is a front view in section of one form of an animal carrying portion of the monitoring apparatus shwon in FIG. 2; and FIG. 5 is an enlarged top view of the animal identifying portion of the monitoring apparatus shown in FIG. 2 with a schematic diagram of one form of electrical circuitry of the monitoring apparatus.

As shown in the drawings, one form of the novel automatic animal monitoring apparatus 11 of the present invention includes an animal reviewing portion 12, an animal identifying portion 13 and a control portion 14. The animal reviewing portion 12 includes at least one animal detecting station and preferably includes a plurality of animal detecting stations. One form of such detecting station is the animal feeding stations 16 shown in the drawings.

Each of the feeding stations 16 includes a trough member 17 and feed storage means such as hoppers 18. Also, the feeding stations 16 include feed transfer means shown as augers 19. The augers 19 convey feed material 20 contained in hoppers 18 to the respective trough members 17.

In addition, the animal reviewing portion 12 includes switch actuating means shown as magnets 29. Means may be provided to create a magnetic field in other ways such as an electrical coil (not shown). Alternatively, the switch actuating means may be a second transmitter (not shown) which transmits an RF signal.

The animal identifying portion 13 of the monitoring apparatus 11 of the invention includes a transmitter section 22 and a receiver section 23. The transmitter section 22 advantageously is disposed on an animal. The transmitter may be hung around the neck of the animal as shown or may be disposed at some other location on the animal. For example, a transmitter mmay be secured in an ear or on the surface of the animal. Also, a transmitter may be positioned inside an animal's body either in the digestive system or under the skin.

The transmitter section 22 as shown in FIG. 4 includes signal generating means 25 including transistors and filters. Also, the transmitter has signal coding means shown as shift registers 26. The transmitter section 22 preferably includes a power source shown as battery 24 or a passive component such as a capacitor (not shown) to activate the transmitter circuitry. Advantageously, the circuitry of the transmitter 22 is sealed in plastic.

The transmitter 22 further includes actuating means 27. The actuating means 27 may be a switch that is actuatable magnetically such as a reed switch. Alternatively, the actuating means 27 may be actuatable by means other than a magnetic field. For example, the switch may be actuatable by an RF signal.

The receiver section 23 is disposed adjacent to the animal reviewing portion 12. The receiver section 23 includes a power source shown as an electrical power supply line 28.

The receiver section 23 further includes signal receiving means 32, signal decoding means 33 (shift registers) and signal transferring means 34. The components of the receiver section 23 advantageously are disposed on a single circuit board 35 located adjacent to the animal reviewing portion 12. An antenna means 31 co-acts with the receiver section 23.

The signal transferring means 34 may include deciphering means shown as an addressable asynchronous receiver/transmitter 37. The addressable receiver/transmitter 37 is connected to a timer 38 and also to an address selector switch 39 and a relay 40. The relay in turn is connected to the auger 19 or similar electrical actuating means.

The receiver/transmitter 37 is connected with the receiver/transmitters (not shown) of other feeding stations 16 by a single pair of lead wires. One of the feeding stations 16 is connected to the control means 42 including a memory section 43, an interrogating section 45, a comparison section 47 and a recording section 48. The connection between the control means 42 and the feeding stations 16 is a serial port connection also with a single pair of lead wires.

The memory section 43 of the control means 42 is capable of receiving and storing an animal performance schedule which can be entered through a keyboard 44. The interrogating section 45 of the control means 42 is capable of addressing each of the feeding station receiver/transmitters 37. The comparison section 47 is capable of comparing a signal received from the interrogating section 45 with the performance schedule entered in the memory section 43. The recording section 48 may include a display section 49 and a record reproducing means 50.

The control means 42 advantageously includes a nonvolatile memory section 43 that is battery powered. This maintains the feeding schedule and log in the event of a power failure.

In the use of the novel animal monitoring apparatus of the invention shown in the drawings, the animals to be monitored may have transmitters 22 placed around their necks. Each transmitter is coded prior to assembly by programming the shift registers 26. In this way, each transmitter 22 and thus each animal transmits a different signal.

The memory section 43 previously has had a performance schedule, such as a feeding schedule, entered therein. This schedule will include the quantities of feed that the owner wishes each particular animal to receive during a given period of time, e.g. 12 hours.

As an animal approaches one of the feeding stations 16, magnetic reed switch 27 within transmitter 22 enters the field of magnets 29. This causes the switch 27 to close, energizing the circuitry of the transmitter. A signal is generated, coded and transmitted by the transmitter.

The receiver section 23 disposed at the feeding station 16 receives the signal from the transmitter 22 and decodes it. The decoded signal is transmitted to deciphering receiver/transmitter 37 which identifies the particular animal at the feeding station 16. This information is available for interrogation by section 45 of control means 42.

Interrogating section 45 continuously and sequentially searches the receiver/transmitter 37 of each feeding station 16 in a rapid sequence determined by timer 38. The receiver/transmitter 37 of each feeding station 16 is coded with selector switch 39 to provide identification of the receiver/transmitter by the interrogating section 45.

When the interrogating section 45 determines that a particular animal is at a specific feeding station, this information is noted by comparing section 47. To insure that the animal at the feeding station is ready to be fed, the comparing means may wait for a repeat of the signal several or more times before comparing the animal identification with information stored in memory section 43.

The comparing section 47 then checks the feeding schedule to determine if the animal has received its complete ration for the current time interval. If not, the comparing section 47 will send a signal back to receiver/transmitter 37 which activates relay 40. The relay 40 energizes auger 19 to convey feed material 20 from hopper 18 into trough member 17 where it can be consumed by the animal at the trough.

The quantity of feed supplied to the animal is recorded for later tabulation and reporting to the owner. At regular preselected time intervals or when the owner desires, a log of the feed that has been given to each of the animals is delivered for inspection by the owner. This can be accomplished by recording section 48 on a tape or other recorded reproduction 50.

The control means 42, as pointed out above, may be positioned at a location remote from the feeding stations. Also, the feeding stations 16 may be at locations remote from one another. The various components are connected to a suitable electrical power source (not shown).

The control means 42 advantageously may be a computer including interrogating, memory and comparison sections. A number of different computers are suitable for use with the feeding apparatus of the invention. The selection of a specific computer may depend upon the feeding capabilities desired. A particularly useful computer is the Rockwell AIM 65 computer and models similar thereto.

While the animal monitoring apparatus 11 of the present invention has been described in detail above with reference to a feeding system, it will be apparent that the apparatus of the invention is useful in a variety of other monitoring functions and operations. For example, the apparatus can be employed in the monitoring of cows in a milking parlor. Also, the apparatus can monitor animals' drinking water. In addition, the apparatus can divert animals moving along a passageway into certain pens by opening and/or closing particular gates as a specific animal approaches.

The above description and the accompanying drawings show that the present invention provides a novel apparatus which monitors animals simply and conveniently. The apparatus of the invention automatically monitors animals according to a preselected performance schedule. Further, the apparatus periodically provides a record of the performance of each animal of a herd.

The programming and recording portions of the monitoring apparatus can be located at points remote from the stations. Furthermore, the programming and recording apparatus can collect and corrolate data from a large number of stations at widely spaced locations.

The monitoring apparatus of the present invention provides a high degree of accuracy and reliability both in detecting an animal at a detecting station and also in identifying which animal is there. Thus, the records furnished by the apparatus provide an accurate basis for determining animal performance and productivity.

The animal monitoring apparatus of the invention is simple in design and relatively inexpensive to manufacture. The apparatus can be fabricated from commercially available materials and components. Conventional manufacturing techniques can be employed in its fabrication.

The apparatus can be utilized with existing facilities as well as being incorporated into new installations. Since the apparatus can be manufactured in a number of subassemblies, it can be installed by the rancher or farmer with a minimum of technical experience or skills. The programming and recording portions of the apparatus can be located at points remote from the detecting stations if desired.

It will be apparent that various modifications can be made in the particular monitoring apparatus described in detail above and shown in the drawings within the scope of the invention. The size, configuration and arrangement of the various components can be changed to meet specific requirements. For example, the location of the transmitter and receiver sections can be varied. Also, different means for actuating the transmitter switch can be employed. In addition, the means provided for controlling or caring for the animals can be modified or changed as desired. Therefore, the scope of the invention is to be limited only by the following claims.

What is claimed is:

1. Animal monitoring apparatus including an animal reviewing portion, an animal identifying portion and a control portion; said animal reviewing portion including a plurality of animal detecting stations including transmitter actuating means; said animal identifying portion including a plurality of transmitter sections and a plurality of receiver sections therefor, each said transmitter section being disposed on an animal, each said transmitter section including selfcontained power source means, signal generating means for producing a first signal, signal coding means for encoding said first signal to produce a second signal unique to a specific animal, and actuating means, each receiver section being disposed adjacent to said reviewing portion, said receiver section including power source means, signal receiving means, signal decoding means and signal transferring means, antenna means co-acting with each receiver section, each of said receiver sections being connected electrically with receiver sections of all other animal detecting stations and with interrogating means, each said transmitter section continuously transmitting said second signal while in the vicinity of a receiving section, and said interrogating means sequentially searching each of said receiver sections in a continuous rapidly repeating sequence, memory means capable of accepting an animal performance schedule, means for comparing signals from said interrogating means with said animal performance schedule, means for selectively activating electrical energizing means, and recording means for compiling a log of the activation of said electrical energizing means and the time periods of such activations.

2. Animal monitoring apparatus according to claim 1 wherein said interrogating means is connected with one of said receiver sections through a serial port connection with a single pair of lead wires.

3. Animal monitoring apparatus according to claim 1 wherein said interrogating means is capable of searching said receiver section of each animal detecting station sequentially at least once each second.

4. Animal monitoring apparatus according to claim 1 wherein each of said receiver sections includes an addressable asynchronous receiver/transmitter.

5. Animal monitoring apparatus according to claim 1 wherein said interrogating means, said memory means, said comparing means and said recording means are disposed in a unitary structure.

6. Animal monitoring apparatus according to claim 5 wherein said unitary structure includes a computer.

7. Animal monitoring apparatus according to claim 1 wherein said transmitter section is hung around the neck of said animal.

8. Animal monitoring apparatus according to claim 1 wherein said actuating means of each transmitter section includes actuatable switching means.

9. Animal monitoring apparatus according to claim 8 wherein said switching means is actuatable magnetically.

10. Animal monitoring apparatus according to claim 1 wherein said animal detecting stations are feeding stations with feed transfer means.

* * * * *